Nov. 30, 1943.  A. R. THOMPSON  2,335,620
PEAR PREPARATION MACHINE
Filed July 13, 1940   6 Sheets-Sheet 2

INVENTOR
ALBERT R. THOMPSON
BY *Philip A. Minnis*
ATTORNEY

Nov. 30, 1943.   A. R. THOMPSON   2,335,620
PEAR PREPARATION MACHINE
Filed July 13, 1940   6 Sheets-Sheet 4

FIG_8_

FIG_9_

FIG_10_

INVENTOR
ALBERT R. THOMPSON
BY
Philip G. Minnis
ATTORNEY

FIG_11_

FIG_12_

FIG_13_

FIG_15_   FIG_14_

INVENTOR
ALBERT R. THOMPSON
BY
ATTORNEY

FIG_16_

FIG_17_

FIG_18_

INVENTOR
ALBERT R. THOMPSON
BY
Philip G. Minnis
ATTORNEY

Patented Nov. 30, 1943

2,335,620

UNITED STATES PATENT OFFICE 2,335,620

PEAR PREPARATION MACHINE

Albert R. Thompson, Los Gatos, Calif., assignor to Food Machinery Corporation, San Jose, Calif., a corporation of Delaware Application July 13, 1940, Serial No. 345,335

27 Claims. (Cl. 146—43)

This invention relates to machines for preparing pears for canning.

In machines of this character the operator places the pears one after another in a feeding mechanism which introduces the pears into the machine proper where they are subjected to a series of operations such as trimming off the ends, peeling off the skin, removing the stem, core, and calyx, and finally splitting the fruit into halves.

The invention is disclosed as embodied in a machine similar to that shown in the patent to A. R. Thompson et al., No. 2,139,704, issued Dec. 13, 1938. In this type of pear preparation machine the operations on the exterior of the pear are performed first and during this part of the preparation the pear is held impaled on a stemming tube. It is, therefore, the principal function of the feeding mechanism to take the pear from the operator's hand and impale it on this stemming tube.

One object of this invention is to provide a feeding mechanism which is adapted to receive the pears at a rapid rate; which does not require a material degree of skill and accuracy in the placement of the pear by the operator; and which cannot injure the operator's hand.

Another object of the invention is to provide a feeding mechanism which will grasp the pear externally in such a way that when it is presented to the stemming tube the stem axis of the pear will be in alignment with the tube so that when the pear is pushed onto the tube it is accurately impaled thereon with its stem inside the tube.

For a complete disclosure of the pear preparation machine in which this invention is embodied reference is to be had to the above-mentioned Patent No. 2,139,704, the disclosure of which is hereby made a part of this disclosure in so far as it is applicable. Accordingly, only the feed mechanism, which is intended to be substituted for the feed mechanism of the prior machine, will herein be described in detail together with such parts of the prior structure as are associated with and pertinent to the operation of the mechanism of the present invention.

To facilitate an understanding of the collocation of the mechanism, which presently is to be disclosed in detail, a brief explanation of its environment, general construction, and superficial operation will be given preliminarily.

The pear preparation machine has a number of instrumentalities which perform several successive operations on each pear as the pears pass through the machine. It is only necessary for an operator to put the pears one after another in the feeding mechanism which automatically introduces them into the machine from which they are subsequently discharged as the finished product ready for canning. One of the first operations to which each pear is subjected is the peeling operation, and the machine is equipped for this purpose with a series of peeling units, one of which is shown at 45 in Fig. 1 and two of which are shown at 45 and 46 in Fig. 6.

Figure 1:
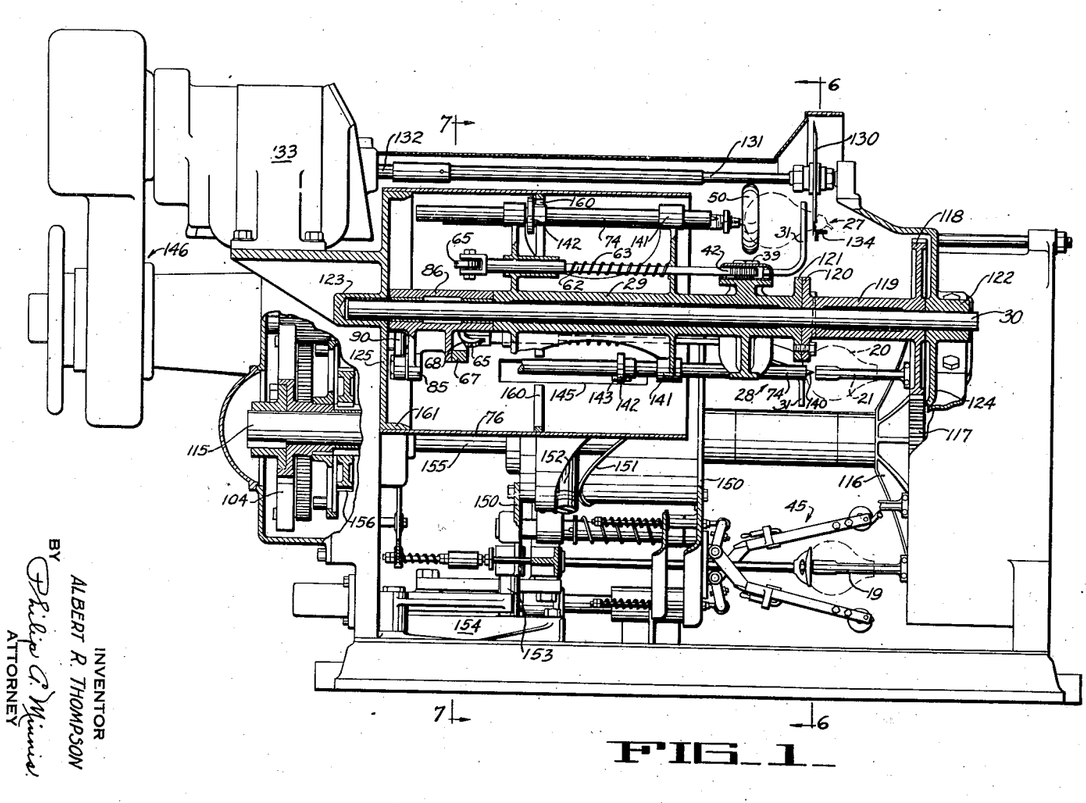
Fig. 1 is a view taken from the right-hand side of the machine. The feeding mechanism is shown in vertical longitudinal section and the machine proper appears in the background. The transmission case at the left, which is the rear end of the machine, has been broken away to show a section of the mechanism therein. The plane of the section through the feeding mechanism and the direction of view is indicated by the arrows I—I in Fig. 2.

As explained in the above-identified patent, a peeling unit, such as that shown at 45 in Fig. 1, removes strips of skin from the pear which is presented to the peeling unit for this operation by means of a hollow stemming tube 19 upon which the pear is impaled as indicated in broken lines in Fig. 1. The stemming tube is mounted on an intermittently rotated turret 116, which serves to present the pear successively to the several peeling units and to other instrumentalities by executing a partial rotation after each operation has been performed on the pear. There is a series of these stemming tubes on the turret which makes it possible for the pears to be carried through the machine in a steady stream. The peeling units are mounted on the front of a carriage 150 (Fig. 6) which reciprocates longitudinally with respect to a shaft 115. In Fig. 1 the carriage 150 has arrived at the end of its forward stroke and is about to return to the left. The intermittent reciprocation of the carriage 150 and the intermittent rotation of the turret 116 alternate in each cycle of operation of the machine. The mechanisms which cause these movements of the carriage and turret are fully described in the above-mentioned patent but they will be again referred to in some detail in this disclosure when such reference becomes necessary to an understanding of the operation of the feeding mechanism.

The principal function of the feeding mechanism is to take the pears from the operator's hand, carry them into the machine, and then impale them on the stemming tubes. This transfer of the pear from the feeding mechanism to the stemming tube takes place at the point indicated generally by the numeral 28 in Fig. 1, where the pear 20 has just been impaled on a stemming tube 21. During the continuous operation of the machine the feeding mechanism impales the pears one after another on successive stemming tubes as they are brought opposite the transfer position 28 by the intermittent rotations of the turret 116.

Figure 8:
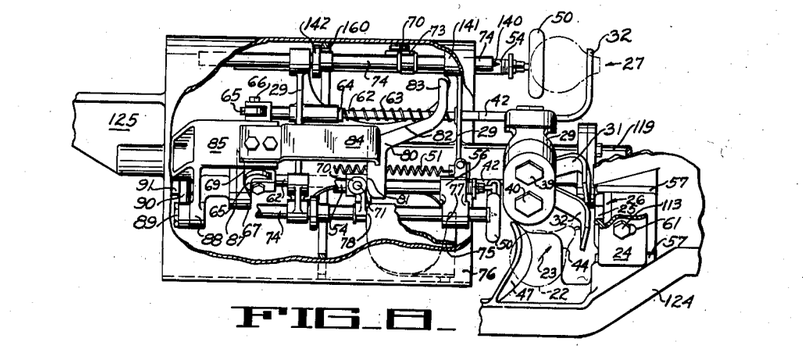
Figs. 8, 9, and 10 are side elevations of the feed mechanism with parts broken away. They disclose different steps in the operation of the pear holder as it grasps the pear which the operator is introducing into the feeding mechanism.

The operator stands on the right-hand side of the machine (Fig. 2) facing the feeding mechanism (Fig. 8). Much of the mechanism is enclosed in a cylindrical housing 76 which has been broken away to expose the interior. The operator introduces the pear 22 in the direction of the arrow 23 (Fig. 8), a rest 44 being provided to support the back side of the operator's hand, and he places the nose of the pear in the bottom of a slot 25 in a gauge 24 (Fig. 9) where he supports it until the fingers 31, 32 of one of the pear holders grasp it. Then he releases the pear and picks up the next one. Meanwhile the pear holder lifts the pear out of the slot 25 (Fig. 6) and carries it away by a clockwise rotation of a reel 29 on its shaft 30. The reel 29 (Figs. 6 and 7) has suitable arms and pads for supporting the pear holders, of which there are three. The reel 29 is periodically rotated a one-third revolution to carry the pears from the loading point 26, where the holders take them from the operator's hand, to the transfer point 28, where they are impaled on the stemming tubes.

Proceeding now with the detailed description: The gauge 24 (Fig. 5) has a U-shaped slot 25 with a rounded lip 43. A hand rest 44 is provided to assist the operator in inserting the nose of the pear in the bottom of the slot 25. The rest 44 with its guard 47 also protects the operator's hand and prevents him from accidentally getting it in the way of moving parts. The rest 44 is formed in a large casting 124 (Figs. 1 and 2) which serves as the front end support of the feeding mechanism unit. The gauge 24 (Fig. 5) is adjustably mounted on the support 124. A laterally-extending portion of the gauge has a flange 48 and shoulder 49 formed along its top edge which fit the upper track of a guide way 57 formed in the support 124. As can be seen, the bottom of the gauge is similarly formed to fit the lower track of the guide way 57. The gauge is slotted at 61 to receive a screw 113 which is threaded into the support 124. The gauge is adjusted by sliding it left or right along the guide way 57 and securing it with the screw 113. This adjustment is provided to take care of the variation in the length of pears.

The three pear holders which will now be described are substantially identical in construction so that a part referred to in one holder is understood to exist in the other two holders as well.

While the operator is holding the pear with its nose resting in the bottom of the slot 25 (Figs. 5 and 6) two fingers 31, 32, which constitute parts of a pear holder, grasp the neck of the pear. The fingers center the neck of the pear in their grip by reason of the complementary arcuate surfaces 33, 34 which contact the pear surface. When the pear has been carried around by rotation of the reel 29 (Fig. 6) to the transfer point 28 the fingers 31, 32 are spread open to release their hold on the pear when it is impaled on the stemming tube.

The fingers extend inwardly toward the reel 29 and then bend at a right angle so that their inner ends 35, 36 lie in a plane parallel to the reel shaft 30. In order to cause the fingers to close together and spread apart to grasp and release the pear, gear segments are formed on the inner ends at 37, 38 which engage the opposite sides of a double rack 42. In Fig. 1 the finger 32 has been removed by section so that the rack 42 may be seen in side elevation. The fingers 31, 32 (Fig. 6) are pivotally mounted on screws 39, 40, which are threaded into the reel 29. A cover 41 is held over the gearing by the screws also.

Figures 5, 6, 7:
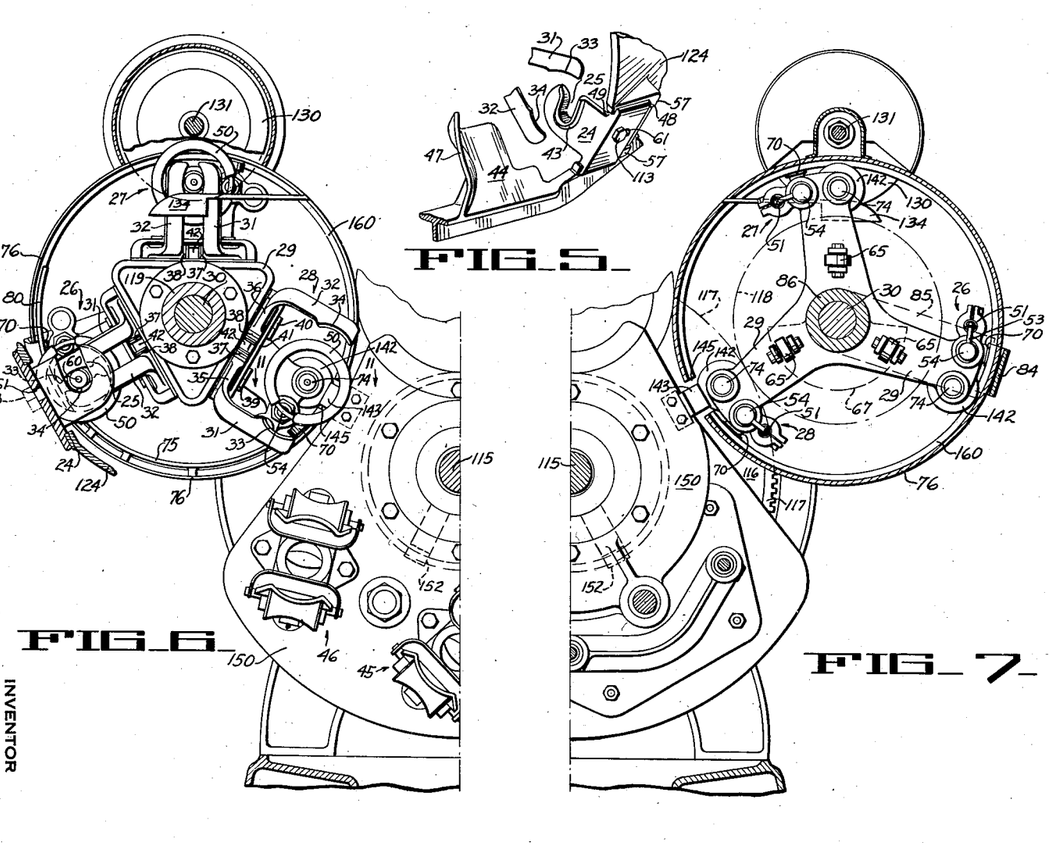
Fig. 5 is a perspective view of a gauge which assists the operator in introducing the pear into the feeding mechanism.
Fig. 6 is a front elevation of the feeding mechanism taken as indicated by the line 6—6 in Fig. 1. The view is extended to the longitudinal center line of the machine to show parts of the peeling mechanism.
Fig. 7 is a rear elevation of the feeding mechanism taken as indicated by the line 7—7 in Fig. 1.

When the rack 42 moves forward toward the reader in Fig. 6 the fingers 31, 32 spread apart, as in the holder at the transfer point 28. When the rack moves rearward the fingers close together, as in the holder at the loading point 26, to grasp the pear which the operator is holding with the nose resting in the slot 25 and with the stem axis approximately horizontal as in Fig. 9.

Figure 9:
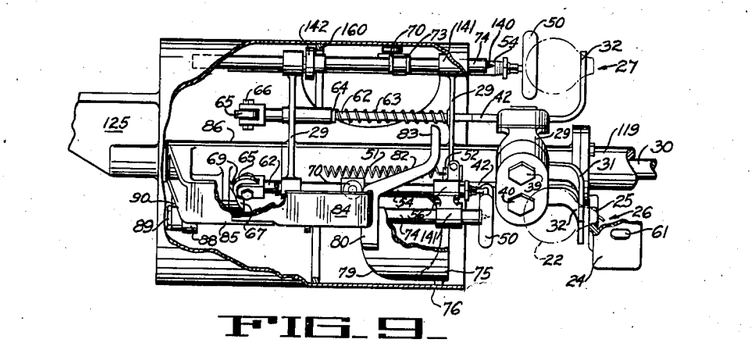

In addition to the fingers 31, 32, each holder has a ring 50 (Fig. 10) which is moved forward into contact with the bulb of the pear by a spring 51 after the fingers have grasped the neck of the pear (Fig. 9). The forward end of the spring 51 is attached to an arm of the reel 29 at 52 and the rear end is attached to a hook 53 which is secured in the rear end of a push rod 54 mounted for sliding in bearings 55, 56 in arms of the reel 29. The push rod 54 carries the ring 50.

The ring 50 is shown diagrammatically in these views. Its detailed construction appears in Fig. 15. It comprises a series of freely rotatable fiber rollers 58 journalled on a carrier ring 59 which is rigidly secured to the forward end of the push rod 54. The ring 59 is circular in cross-section and the rollers 58 have circular holes therein. The ring is split at 136 to facilitate assembling the rollers 58 thereon and the ends 126, 127 of the ring are welded to a pin 128. The forward end of the push rod 54 (Fig. 12) is apertured to receive the pin 128 therein. It is also split at 135 and externally threaded to receive a nut 129, which serves to clamp the pin 128 in the end of the push rod 54.

When the push rod moves the ring forwardly (toward the reader in Fig. 15) the rollers 58 contact the bulb of the pear and center it. Due to depressions and protuberances on the pear some of the rollers may not contact it but the use of a plurality of contact members in a circle causes the ring to feel out the mean diameter, at the center of which the stem axis of the pear will be located.

Bearing this in mind and turning again to Fig. 6 it will be noted that the center of the ring 50 is on the same axis as a point 60 mid way between the arcuate surfaces 33, 34 on the fingers 31, 32 and this axis will be substantially coincident with the stem axis of the pear when it has been grasped by the holder.

Figure 10:
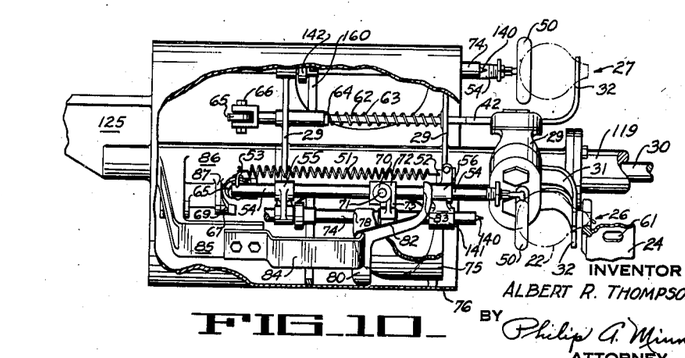

Therefore, when the holder has finally taken hold of the pear as shown in Fig. 10, it will grasp the pear so that the stem axis thereof is horizontal and parallel to the axis of the reel 29 and this results from the fact that the fingers 31, 32 center the stem end of the pear axis when they grasp the neck and the ring 50 centers the butt end of the pear axis when it centralizes the bulb of the pear in its rollers. All the operator is required to do is to rest the nose of the pear in the gauge 24, and to hold it there until the fingers and ring grasp the pear and in so doing automatically position it with its stem axis horizontal.

I have found that this method of grasping and holding the pear results in accurate positioning thereof. Pears individually differ in shape but, as a general rule, whatever their shape may be, the exterior contour of the pear is substantially symmetrical with respect to the stem axis of the pear. Since the stem axis passes centrally through the neck of the pear and also passes through the center of the bulb, I conceived the idea of obtaining the required positioning of the stem, not by entering the pear in search of the stem, but by exterior contact at the neck and bulb.

While the fingers 31, 32 (Fig. 6) are resiliently pressed into contact with the neck of the pear, as will be next described, it is to be borne in mind that the fingers are positively geared together by the segments 37, 38 in engagement with their common rack 42. It is, therefore, impossible for one finger to move more than the other. Their mutual movements are in opposite directions but always equal in amount. Consequently, the arcuate surfaces 33, 34 when closing on the pear, approach their common center and axis 60 at equal rates, so that at any instant corresponding points in the two surfaces are equi-distant from the axis 60. It makes no difference whether one or the other surface touches the neck of the pear first. If it does, it shifts the pear over until both surfaces are touching. When this occurs the complementary surfaces 33, 34 are equi-distant from the axis 60 and therefore the stem axis of the pear is centralized in their grip.

The surfaces 33, 34 because of their curvature also have a camming action on the pear if it is positioned with its axis too far away or too near the axis of the reel shaft 30. It will be noted that the two arcuate surfaces 33, 34 are arranged on either side of and equidistant from a radial line emanating from the center of shaft 30 and passing through the center 60, so that the arcuate surfaces shift the stem axis of the pear radially of the reel if necessary to bring the stem axis into coincidence with the axis 60.

As shown by Figs. 8 to 10 the fingers centralize and grasp the neck of the pear before the ring 50 moves up to centralize the bulb. The result is that the ring 50 being urged axially against the pear not only shifts the bulb of the pear to align the stem axis but completes the grip on the pear by pressing it against the fingers so that between them the fingers and the ring can hold the pear and carry it when the reel rotates.

The means for causing the holder to grasp the pear will now be described. The rack 42 which opens and closes the fingers is formed on the end of a push rod 62 (Fig. 10) which is mounted for sliding in the arms of the reel 29. It will be remembered that the three holders are substantially identical in construction. The push rod 62 in the upper holder (Fig. 10) being visible, is referred to; however, there is a similar push rod in each of the other holders. A spring 63 interposed between the forward arm of the reel and a shoulder 64 on the rod urges the rod rearwardly to tend to close the fingers 31, 32. A roller 65 is journalled on a pin 66 carried by the rear end of the push rod. A cam 67 acts on this roller to push the rod forward to spread the fingers at the proper times. In Fig. 8 the cam 67 is holding the fingers partially open at the loading point 26 so that the operator can introduce the neck of the pear therebetween. In Fig. 9 the cam is moving down from under the roller 65 and the fingers are closing on the neck of the pear. In Fig. 10 the cam has freed the roller and the fingers are grasping the pear resiliently.

The ring 50 (Fig. 10), it will be recalled, is also urged into engagement with the pear by its spring 51. It also is withdrawn and released by cam and roller. The roller 70 is mounted on a pivot 71 in a bracket 72 secured to the push rod 54. The bracket has a fork 73 which engages a push rod 74, the function of which will presently be described, to prevent the ring push rod 54 from rotating in its bearings 55, 56 and to maintain the ring 50 properly centered at all times. There are two cams with which the roller 70 comes into engagement.

Figures 13, 14, 15:
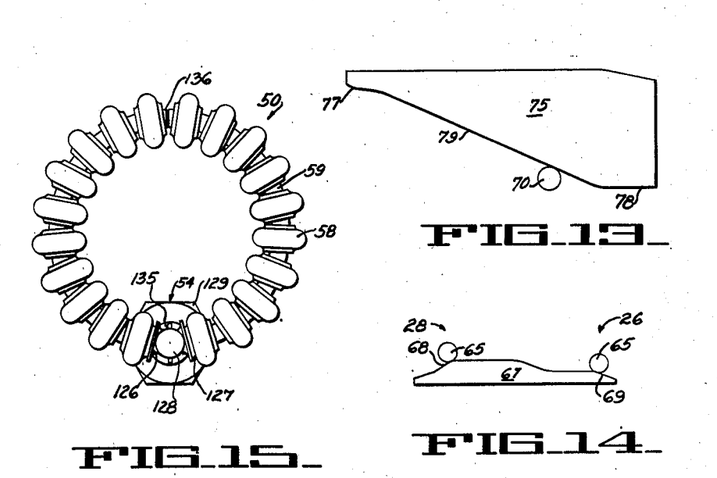
Figs. 13 and 14 are developments of cams used in the feeding mechanism.
Fig. 15 is a detail view of the ring which is pressed into contact with the bulb of the pear.

One is the cam 75, which is semi-cylindrical in shape and is rigidly mounted in the bottom of the cylindrical housing 76 of the feed mechanism (Fig. 6). The housing 76 is rigidly secured to the framework of the machine. As can be seen in Fig. 8 the cam edge of the cam 75 begins at 77 which is on the far side of the feed housing 76. The cam edge ends at 78. A development of this stationary cam is shown in Fig. 13. When the reel rotates, the roller 70 (which is on the ring push rod) rolls from 77 along the camming edge 79 to the land 78. The function of this cam is to withdraw the ring preparatory to the loading operation which is being described, and the withdrawal takes place as the reel rotates to bring the holder up to the loading position 26 shown in Figs. 8, 9 and 10.

As the reel comes to rest the roller 79 (Fig. 8) runs off the end 78 of the stationary cam 75 onto the vertical edge 81 of a downwardly movable cam 80. This cam is also cylindrically shaped to fit inside the housing 76 as can be seen in Fig. 6. It has an inclined edge 82 (Figs. 8 to 10). When the roller 79 travels along the downwardly-moving edge 82 the ring 59 moves forwardly into engagement with the pear. The function of the cam 80 is to release the ring gradually so that it is brought gently into contact with the pear. In its final position shown in Fig. 10 it has entirely freed the roller 79 so that the push rod 54 is solely under the influence of the spring 51. To limit the forward movement of the ring when no pear is placed in the feed mechanism the cam 80 has an extension 83 with which the roller 79 comes into contact.

Both the cam 80 which releases the ring 59 and the cam 67 which permits the fingers to grasp the pear are mounted for movement in unison. That movement is a periodic oscillation about the reel shaft 30. The cam 80 is rigidly secured by means of a bridge 84 to an arm 85, the hub 86 of which is journaled on the reel shaft 30 but which is independent of the reel in its movements. An arcuate flange 87 formed on the hub has the cam 67 secured thereto. A crank 88 (Fig. 8) is formed integrally with the arm 85 and is connected by a crank pin 89 to a link 90 which extends out through an aperture 91 in the far wall of the housing. The link oscillates the cam operating arm 85 which, in Fig. 8, is at its extreme upper position, and, in Fig. 10, at its extreme lower position. In Fig. 9 it is at its intermediate position.

Figures 2, 3, 4:
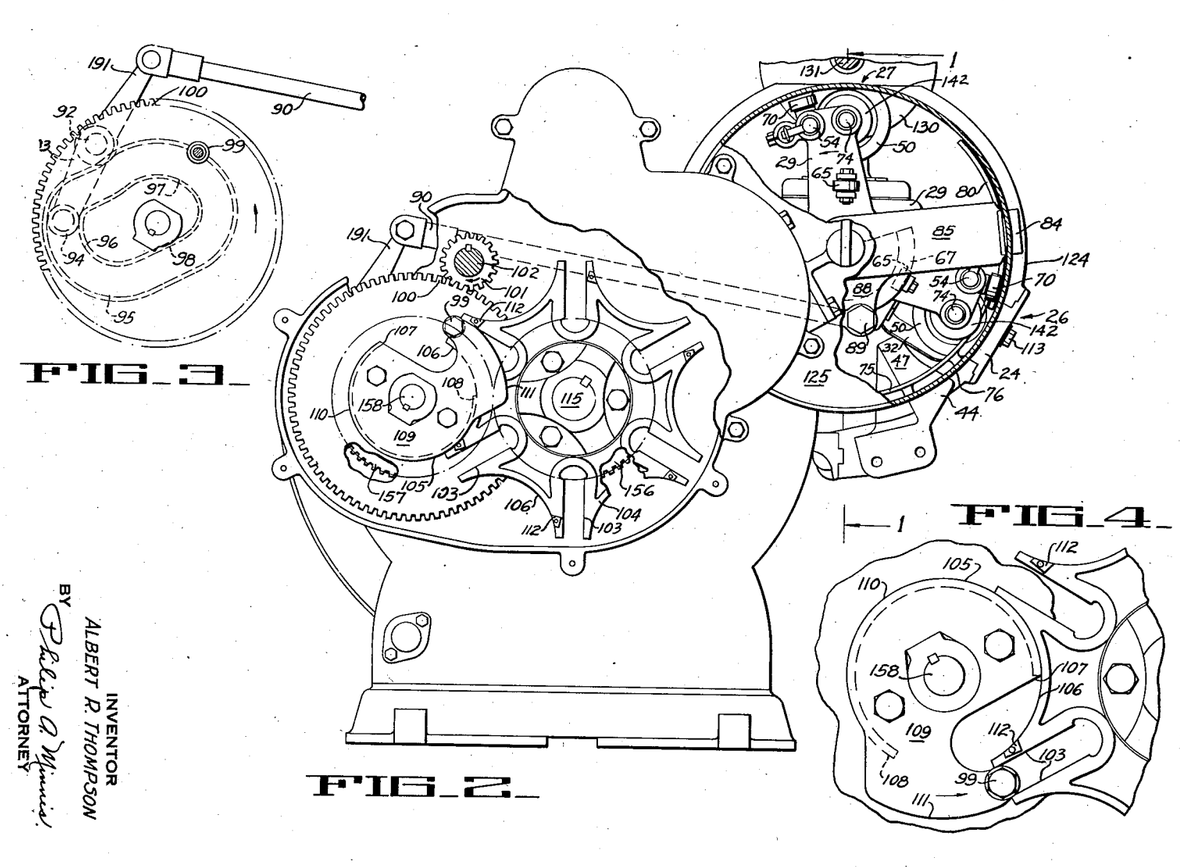
Fig. 2 is a rear elevation of the machine. The feeding mechanism is in the cylindrical housing at the upper right, the rear wall of which has been broken away to reveal the mechanism within. The transmission case has also been broken away to show certain parts of the driving mechanism therein.
Fig. 3 shows the timing cam which is on the front side of the machine driving gear in the transmission. This controls the operation of the pear holders in the feeding mechanism so that they grasp and release the pears at the proper times.
Fig. 4 shows the back-lash eliminator for the Geneva wheel.

The link 90 (Fig. 2) extends across to the other side of the machine where it is pivotally connected to a crank 191 which is secured to a shaft 92 (Fig. 3) journaled in the frame of the machine. This shaft extends into the transmission case where it has secured thereto another crank 93 which has a roller 94 that follows a cam track 95. As shown in Fig. 3 the roller is in the maximum-radius portion 96 of the cam track which has an intermediate radius portion 97 and a minimum radius portion 98. These three cam radii 96, 97, 98 position the arm 85 in the positions shown in Figs. 8, 9, and 10, respectively. When the arm 85 is in its top position in Fig. 8 the roller 94 is on the maximum radius portion 96 of the cam track 95 (Fig. 3). As the cam track 95 rotates in the direction of the arrow the roller 94 moves in to the intermediate radius portion 97 and the arm 85 moves to the position shown in Fig. 9. When the roller arrives at 98, the arm 85 is in the bottom position shown in Fig. 10.

The cam track 95 (Fig. 3) is formed on the front side of the driving gear 100 which is rotated at constant speed by the driving pinion 101 (Fig. 2) on power shaft 102. For each revolution of the gear 100 the machine performs one complete cycle of operations. Thus the operations of the cams for controlling the fingers and rings of the holders in the feed mechanism are timed with the other operations of the machine. The feed mechanism presents a pear to be impaled on a stemming tube at the proper time in each cycle as will appear from the following description.

The driving gear 100 has projecting from its rear face toward the reader (Fig. 3) a driving pin 99 which enters the slots 103 (Fig. 2) of a Geneva wheel 104 to rotate it. There are six radial slots 103 spaced 60° apart so that for each revolution of the gear 100 the pin 99 rotates the geneva 60° and this rotation occurs during only a part of the cycle of gear 100, the Geneva wheel being locked against movement when the pin 99 is out of engagement with one of the slots 103.

The gear 100 has a segmental cylindrical flange 105 (Fig. 2) which moves into engagement with arcuate surfaces 106 intervening the radial slots 103 in the Geneva wheel when the pin leaves a slot. When the end 107 of the flange is at dead center the geneva is unlocked for movement clockwise. This is to be desired when starting to rotate the geneva but the reverse condition occurs at the end of the rotation.

As shown in Fig. 2 the driving pin is just leaving the slot and the other end 108 of the flange is at dead center on the arcuate surface 106. The instant the pin leaves the slot the geneva could be rocked slightly counterclockwise because the flange 105 is not yet in full registry with the arcuate surface 106. It is essential to the dependable and accurate operation of the feed mechanism, as will presently appear, that back-lash of the geneva be eliminated at this time. For this purpose a plate 109 is secured to the gear 100 by screws. It has an arcuate edge 110 (Fig. 4) that is flush with the flange 105 and another arcuate edge 111 which moves into locking engagement with lugs 112 attached to the Geneva wheel adjacent each slot 103. As shown in Fig. 2, the edge 111 is coming into contact with the lug 112 just as the pin 99 is leaving the slot. It remains so until the flange is in complete register with the arcuate surface. Thus the Geneva wheel is locked against clockwise movement by the flange 105 and against counterclockwise movement by the edge 111 of the plate 109 sliding along the lug 112.

The reason the Geneva wheel 104 must be locked is that it drives, and therefore controls the position of, the turret on which the stemming tubes are mounted. The geneva is keyed to the rear end of a shaft 115 which passes longitudinally through the center of the machine. At its forward end the shaft 115 (Fig. 1) has secured thereto for rotation therewith the turret 116 which has six hollow stemming tubes, similar to the tube 21, secured around its rim at 60° intervals, which construction is disclosed in Patent No. 2,139,704. At the time that the pear 20 is impaled on the tube 21 the turret is standing still and the back-lash eliminator on the geneva accurately positions the tube 21 and holds it immovably in this position while the pear is being impaled thereon to insure accurate placement of the pear with its stem axis in the tube.

The pear is carried to this position of transfer to the stemming tube from the position where the operator placed it in the holder by rotation of the reel 29. The reel derives its rotation from the turret which has a ring gear 117 (Fig. 1) around its periphery. The teeth of the ring gear 117 engage with the teeth of a spur gear 118. The hub 119 of the gear 118 is elongated and provided with a flange 120 for coupling to a flange 121 on the hub of the reel 29. The hub 119 is keyed to the reel shaft 30 which is supported in bearings 122, 123 in front and rear supports 124, 125 secured to the frame of the machine.

The rear support 125 (Figs. 1 and 2) has a peripheral flange 161 to which the cylindrical feed housing 76 is rigidly secured. When the geneva 104 is turned, the turret rotates 60°, and through the gears 117, 118 rotates the reel. The diameter of reel gear 118 (Fig. 7) is one-half the diameter of turret ring gear 117 so that the reel is rotated 120°. The three pear holders at 26, 27, 28 are located 120° apart on the reel, so that each pear is first grasped by the holder at 26, is then carried 120° to the top of the feed housing where it comes to rest at 27, and finally is carried another 120° to the position 28 from which it is transferred to the stemming tube on the turret.

In the top position 27 the nose of the pear is cut off by a circular knife 130 on the shaft 131 (Fig. 1) which is coupled to the armature shaft 132 of the motor 133 which supplies the power for operating the machine by means of driving connections in the housings indicated generally at 146, all of which are disclosed in Patent No. 2,139,704. A shearing ledge 134 supports the nose of the pear so that the knife 130 can make a clean cut. It will be understood that the pear is at this time held in the grasp of the ring 50 and fingers 31, 32.

The next rotation of the reel carries the pear to the transfer position 28 where it is held with its stem axis in alignment with the stemming tube 21. It is now pushed onto the stemming tube by the push rod 74 which has a needle point 140 that enters the calyx of the pear. The push rod 74 is slidably mounted in bearings (such as 141, Fig. 1) in the reel 29 and it has a collar 142 rigidly secured thereto. This collar is engaged by a jaw 143 which projects through a slot 145 in the feed housing and reciprocates therein.

The jaw 143 is secured to the reciprocatory carriage 150 which is reciprocated by means of a cylindrical cam way 151 with which a constantly-rotating pin 152 engages. The carriage is constrained to reciprocatory movement by a pin 153 rigidly secured thereto and depending into a straight-line guide 154 secured to the base of the machine. The cam way 151 is an integral part of the carriage 150. The pin 152 is rigidly secured to and extends radially from the front end of a sleeve 155 rotatably mounted on the shaft 115 and driven by a gear 156 which meshes with a gear 157 (Fig. 2) secured to the shaft 158 of the main drive gear 100.

The cam way 151 (Fig. 1) is so arranged that a reciprocatory stroke is derived from the constantly-rotating pin 152 during the rest period of the turret 116, i. e., while the Geneva wheel 104 (Fig. 2) is locked against movement. There is a dwell (not shown) in the camway 151 (Fig. 1) which holds the carriage at rest at the rear end of its stroke during the interval of rotation of the turret.

In all positions except the transfer position 28 where the collar 142 is in the jaw 143, the push rod 74 is held retracted by engagement of the collar 142 behind an annular ring 160 secured to the inside of the cylindrical feed housing 76. It will be noted in Fig. 7 that the collars 142 in the holders at 26 and 27 are in engagement with the ring 160 but that the collar 142 in the holder at 28 is in the jaw 143 which projects in through the slot 145. The ring 160 terminates at the edges of this slot. The engagement of the collars with the ring is also shown in Figs. 8, 9 and 10. The engagement of the collar 142 in the jaw 143 can be seen in Figs. 11 and 12.

Figure 11:
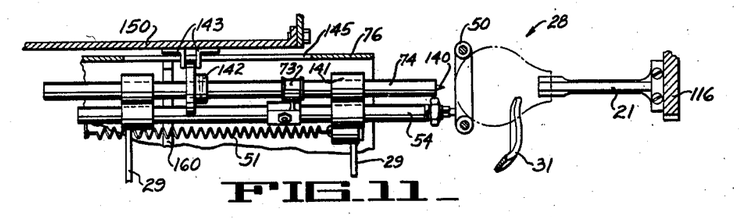
Figs. 11 and 12 show how at the transfer point the pear is pushed out of the holder onto the stemming tube. The point of view is indicated at 11—11 in Fig. 6.
Figure 12:
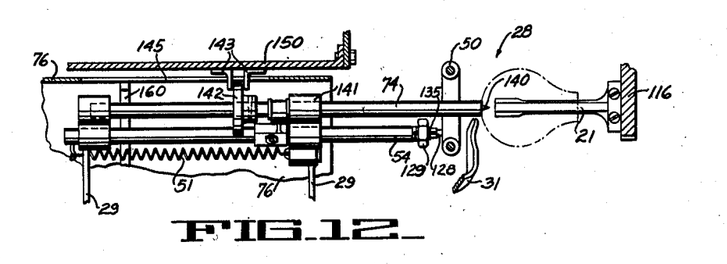

When the pear arrives at the transfer position 28 (Fig. 11) it is still in the grasp of the fingers 31, 32 and the ring 50. The spring 51 is urging the ring push rod 54 forwardly to press the ring 50 against the pear. However, the pear cannot move forwardly because it is grasped by the fingers. Accordingly, the fingers are caused to release the pear, by a mechanism which will be described later. As the fingers spread open the ring pushes the pear forwardly and starts it onto the stemming tube 21 as shown in Fig. 11. The needle point 140 is not yet in engagement with the calyx but the push rod 74 is being slid forward by the jaw 143 on the reciprocating carriage 150. As the carriage approaches the end of its forward stroke the nose of the needle 140 engages the calyx and the push rod 74 forces the pear onto the stemming tube as shown in Fig. 12. The fingers 31, 32 are by this time spread wide open as shown in Fig. 6 at 28.

The fingers are opened by the cam 67 (Figs. 1, 2, 7 and 14) which is oscillated clockwise (Fig. 7) to engage the roller 65 of the holder at 28. It will be noted in Fig. 1 that the cam 67, in moving away from the reader, engages the roller 65 and cams the push rod 62 forward. The rack 42 is on the forward end of the push rod 62 and it opens the fingers 31, 32 because of its engagement with the gear segments 37, 38 (Figs. 1 and 6).

A development of the cam 67 is shown in Fig. 14. The portion of the cam which engages a roller 65 as just described to open the fingers at the transfer point 28 is indicated at 68. It will be noted in Figure 7 that the arcuate cam 67 has a zone of influence that embraces the rollers 65 at both the loading point 26 and the transfer point 28. The throw of the cam at 68 (Fig. 14) is designed to cause maximum displacement of the rack so that the fingers are spread wide open at 28, Fig. 6, in order to permit the bulb of the pear to pass between them. The throw of the cam at 69 is less because the fingers need be held only partially open to permit introduction of the neck of the pear therebetween at the loading point 26 (Figs. 5 and 8). When the cam 67 moves to the left in Fig. 14, the roller 65 at the loading point 26 rolls off the tapered end and allows the fingers to grasp the pear.

After impaling the pear on the stemming tube the push rod 74 (Fig. 12) is withdrawn by the rearward stroke of the carriage 150, the jaw 143 returning the collar 142 to its starting position where it is behind the plane of the ring 160. When the reel 29 rotates, the collar is carried out of the jaw and follows along the ring.

The rotation of the turret 116 (Fig. 1) carries the pear 20 impaled on the stemming tube 21 away from the transfer point 28 and presents it to the first peeling unit 46 (Fig. 6). At the same time it positions the next stemming tube at the transfer point ready to receive the next pear from the feed mechanism.

Figures 16, 17, 18:
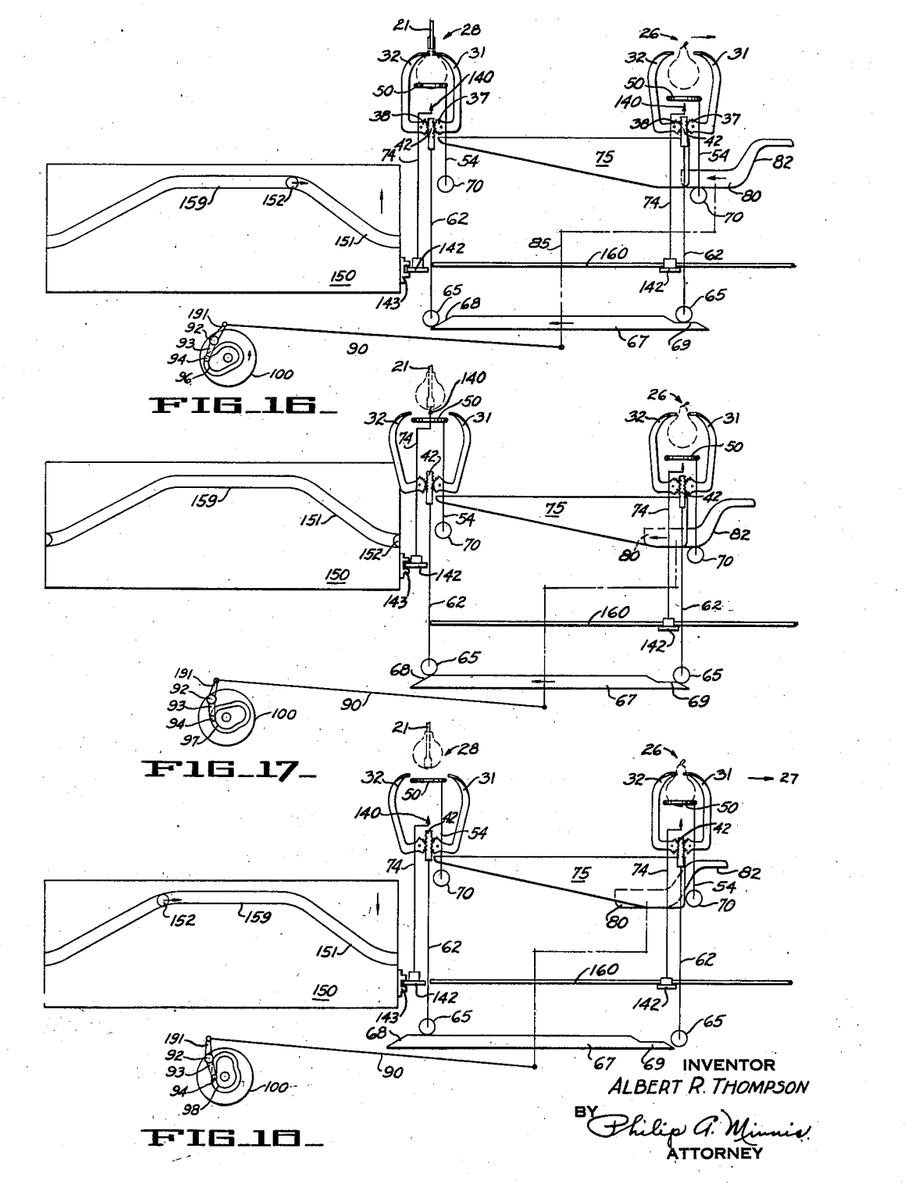
Figs. 16, 17 and 18 diagrammatically show different stages of the operation of the feeding mechanism both in grasping the pear and in transferring it to the stemming tube.

Figs. 16 to 18 illustrate diagrammatically the various operations of the holders in the feed mechanism. The general plan of these diagrams is the use of developments. The three stages of the operations here illustrated all take place while the carriage 150 is reciprocating, as indicated by the different positions of the driving pin 152 in the camming portions of the camways 151. The turret is standing still as evidenced by the absence of the driving pin 152 from the dwell 159 in the camway 151. In Fig. 16 the pin 152 is just leaving the dwell 159 and starting the forward movement of the carriage 150. In Fig. 17 the carriage 150 is at the end of the forward stroke. In Fig. 18 the carriage 150 is just arriving at the end of its rear stroke and the pin 152 is about to enter the dwell 159. While the pin is traveling through the dwell to return to the position in Fig. 16, the turret and reel rotate to shift the pears from one position to another. But from the position of pin 152 in Fig. 16 to its position in Fig. 18 the reel is standing motionless and the turret is locked to hold the stemming tube 21 accurately and rigidly in place to receive the pear.

The holders at the loading position 26 and the transfer position 28 are shown because operations occur at both points simultaneously. In order to avoid confusion a description of the operation at each point will be carried through the three figures separately. Thereafter, it is thought, the coordination of the operations at both points will be apparent from the illustrations.

Beginning with the loading operation at 26 (Fig. 16) the operator may introduce the pear into the holder because the fingers 31, 32 are held partially open by reason of their gear segments 37, 38 engaging rack 42 on push rod 62 whose roller 65 is on the intermediate throw 69 of cam 67, and because the ring 50 is retracted by reason of the roller 70 on its push rod 54 being in contact with cam 80. Also the needle point 140 on push rod 74 is withdrawn by engagement of its collar 142 behind ring 160.

While the operator is holding the pear the fingers 31, 32 close on the neck of the pear as shown in Fig. 17 because the gear 100 rotates the cam thereon until the intermediate radius 97 engages the follower 94 causing the linkage 93, 92, 191, 90 to move the cam 67 to the left and allow the roller 65 to roll off the tapered end 69. Since the cam 67 and the cam 80 move in unison the cam 80 is also moved to the left to bring the inclined portion 82 into contact with the roller 70 to release the ring 50 which moves forward against the bulb of the pear as shown in Fig. 18. The roller 70 is free of the cam 80 and the roller 65 is free of the cam 67 in Fig. 18 so that the fingers 31, 32 and the ring 50 have resiliently grasped the pear and centered its axis. When the reel rotates they will carry the pear away to the right to the position 27 which it was not thought necessary to show in this diagram because the holder is then out of the zone in which it is controlled by the cams.

Upon the next rotation of the reel this same pear will be carried to the transfer point 28. As shown in Fig. 16, the pear is still held in the grasp of the fingers 31, 32 and the ring 50. During the rotation of the reel the gear 100, which rotates constantly, moved the maximum radius portion 96 into engagement with the cam follower 94 to restore the cams 67 and 80 to their initial positions. It will be noted in Fig. 16 that the collar 142 is in the jaw 143 and that the carriage 150 is about to move forward. Also, the follower 94 is about to leave the maximum radius 96 for the intermediate radius 97. When it does so the cam 67 moves to the left and its end 68 cams the roller 65 forward causing maximum displacement of the push rod 62 which through its rack 42 spreads the fingers 31, 32 wide open so that when the needle point 140 (Fig. 17) on push rod 74, pushes the pear onto the stemming tube 21 the bulb of the pear can pass through the fingers. It will be understood by a comparison of Figs. 16 and 17 that the moment the fingers start to spread open the ring 50 pushes the pear onto the stemming tube a short distance so that the pear is then held in position because its neck is impaled on the stemming tube and its bulb is still centered in the ring. Then the needle point pierces the calyx and supports the butt of the pear in axial alignment as the push rod 74 pushes the pear all the way onto the stemming tube. Upon the return movement of the carriage 150 (Fig. 18) the needle point 140 is withdrawn from the pear and the jaw 143 positions the collar 142 so that when the reel rotates the collar will follow the ring 160. When the reel rotates after the transfer operation the roller 65 which controlled the operation of the fingers 31, 32 at the transfer point 28 rolls to the right in Fig. 18 and upon arrival at 69 (Fig. 16) has partially closed the fingers preparatory to the loading operation at 26. The ring 50 is retracted during the rotation of the reel by the roller 70 following the stationary cam 75 which switches it onto the movable cam 80.

While I have described a particular embodiment of the present invention, it will be obvious that various changes and modifications may be made in the details thereof without departing from the spirit of the present invention and the scope of the appended claims.

Having thus described my invention and in what manner the same may be used, what I claim as new and desire to protect by Letters Patent is:

1. A pear preparation machine having peeling means for removing the skin of the pears, and feeding mechanism for introducing the pears into said means, said feeding mechanism comprising a fixed framework, a reel rotatably mounted in said framework, a plurality of pear holders mounted on said reel and successively presented thereby to a loading point, which point is fixed with respect to said framework, a gauge attached to said framework at the loading point, said gauge having a U-shaped slot the bottom of which is semi-circular to provide a rest for the nose of the pear, each pear holder including two fingers interconnected for equalized movement, said fingers having complementary arcuate surfaces which contact the pear externally at the neck, corresponding points in said two surfaces being equidistant from a common center, said center being in alignment with the center of said semi-circular bottom of said slot when the holder is presented at the loading point.

2. A pear preparation machine having peeling means for removing the skin of the pears, and feeding mechanism for introducing the pears into said means, said feeding mechanism comprising a fixed framework, a reel rotatably mounted in said framework, a plurality of pear holders mounted on said reel and successively presented thereby to a loading point, which point is fixed with respect to said framework, a gauge attached to said framework at the loading point, said gauge having a U-shaped slot the bottom of which is semi-circular to provide a rest for the nose of the pear, each pear holder including two fingers interconnected for equalized movement, said fingers having complementary arcuate surfaces which contact the pear externally at the neck, corresponding points in said two surfaces being equidistant from a common center, said center being in alignment with the center of said semi-circular bottom of said slot when the holder is presented at the loading point, and a contact ring mounted for reciprocatory movement with respect to said reel, the center of said ring moving along the line of reciprocation, said line passing through said finger center and said gauge center.

3. A pear preparation machine having peeling means for removing the skin of the pears, and feeding mechanism for introducing the pears into said means, said feeding mechanism including a fixed framework, a plurality of pear holders which are successively presented to a loading point, said point being fixed with reference to said framework, each holder including two fingers which grasp the neck of the pear and a contact ring which presses against the bulb of the pear, a gauge attached to said framework at the loading point having a U-shaped slot in which the operator of the machine places the nose of the pear before said fingers grasp the neck, and a rest integral with said framework for supporting the operator's hand while he is holding the pear for engagement of the bulb thereof by said ring.

4. A pear preparation machine having peeling means for removing the skin of the pears and feeding mechanism for introducing the pears into said means, said feeding mechanism including a fixed framework, a plurality of pear holders which are successively presented to a loading point, said point being fixed with reference to said framework, each holder including two members which close together to grasp the pear, and a gauge attached to said frame work at the loading point having an aperture in which the operator of the machine places the nose of the pear to position the pear for seizure by said members.

5. A pear preparation machine having peeling means for removing the skin of the pears and feeding mechanism for introducing the pears into said means, said feeding mechanism including a fixed framework, a plurality of pear holders which are successively presented to a loading point, said point being fixed with reference to said framework, each holder including two members which close together to grasp the pear, and a gauge having an aperture in which the operator of the machine places the nose of the pear to position the pear for seizure by said members, said gauge being adjustably secured to said framework at the loading point, the adjustment being a translatory movement of the gauge to vary the spacing between said aperture and said members to allow for variation in the length of pears.

6. A pear preparation machine having a turret equipped with stemming tubes, a carriage intermittently reciprocated in a line parallel to said tubes, a feeding mechanism comprising a cylindrical housing, a reel within said housing, said reel being intermittently rotated between the intermittent reciprocations of said carriage, a plurality of pear holders mounted on said reel which are thereby successively presented to said tubes at a point of transfer, each pear holder comprising means for grasping the pear externally and positioning its stem axis parallel to said stemming tubes, a push rod associated with each holder and slidably mounted in said reel, a center carried by each push rod in alignment with the calyx of the pear, a collar on each push rod, an aperture in said housing adjacent the point of transfer, a jaw on said carriage projecting into said aperture, and a ring secured inside said housing and serving to engage said collars and maintain said push rod retracted except when opposite said aperture at which time the collar of the push rod at the transfer point is in said jaw.

7. A pear preparation machine, having a turret equipped with stemming tubes, a carriage intermittently reciprocated in a line parallel to said tubes, a feeding mechanism comprising a plurality of pear holders mounted on an intermittently-rotated reel which successively present the pears to said tubes at a point of transfer, the rotations of said reel alternating with the reciprocations of said carriage, each pear holder comprising means for grasping the pear externally and positioning its stem axis parallel to said stemming tubes, a push rod associated with each holder and slidably mounted in said reel in alignment with the stem axis of the pear, and a temporary connection, comprising a part on said carriage and another part on each push rod, which connection is established at the conclusion of each rotation of said reel, said connection serving to impart the reciprocation of said carriage to the push rod associated with the holder at the point of transfer.

8. A pear preparation machine having a turret equipped with stemming tubes, a carriage intermittently reciprocated in a line parallel to said tubes, a feeding mechanism, comprising a reel intermittently rotated between the intermittent reciprocations of said carriage, a plurality of pear holders mounted on said reel which are thereby successively presented to said tubes at a point of transfer, each pear holder comprising fingers resiliently grasping the neck of the pear and a contact ring spring-urged against the bulb of the pear, means including a cam actuated when the holder has arrived at the transfer point to spread said fingers apart so that said contact ring can spring-press the pear part way onto the stemming tube, and a push rod reciprocated by said carriage to thereafter force the pear the rest of the way onto the stemming tube.

9. A pear preparation machine having peeling means for removing the skin of the pears, and feeding mechanism for introducing the pears into said means, said feeding mechanism comprising a stationary framework, a reel mounted therein for rotation, a plurality of pear holders mounted on said reel and successively presented to a transfer position and then to a loading position by rotation of said reel, said positions being fixed with respect to said framework, each of said holders including a contact ring, a spring urging said ring into engagement with the bulb of the pear, a cam fixed to said framework to positively retract the ring of a holder against the action of its spring when the holder is moved from the transfer position to the loading position by rotation of said reel, and a second cam movable with respect to said first cam to release said ring to the influence of its spring after the holder has arrived at the loading position.

10. A pear preparation machine having peeling means for removing the skin of the pears, and feeding mechanism for introducing the pears into said means, said feeding mechanism comprising a stationary framework, a reel mounted therein for rotation, a plurality of pear holders mounted on said reel and successively presented to a transfer position and then to a loading position by rotation of said reel, said positions being fixed with respect to said framework, each of said holders including a contact ring, a spring urging said ring into engagement with the bulb of the pear, and a cam fixed to said framework to positively retract said ring against the action of said spring when the holder is moved by rotation of said reel from the transfer position to the loading position.

11. A pear preparation machine having means for removing the skin of the pears, and feeding mechanism for introducing the pears into said means, said feeding mechanism comprising a stationary framework, a reel mounted therein for rotation, a plurality of pear holders mounted on said reel and successively presented to a loading position by rotation of said reel, said loading position being fixed with respect to said framework, each of said holders comprising fingers adapted to engage the neck of the pear, said fingers being interconnected for equalized movements, a spring-urged actuator for said fingers, a contact ring for engaging the bulb of the pear, a spring-urged actuator for said ring, and cam means movable with respect to said reel to control the operation of said actuators to cause the ring and fingers of each holder to close upon a pear when the holder is at the loading position.

12. In a pear preparation machine, a pear holder having a ring of spaced apart contacts for engaging the bulb of the pear, and a push rod to support said ring mounted for reciprocation along a line parallel to the stem axis of the pear.

13. In a pear preparation machine, a pear holder having a ring of spaced apart contacts for engaging the bulb of the pear, a push rod to support said ring mounted for reciprocation along a line parallel to the stem axis of the pear, a spring urging said push rod toward the pear, and cam means to positively move said push rod away from the pear.

14. In a pear preparation machine, a pear holder comprising fingers adapted to grasp the neck of the pear externally, and a plurality of substantially-identical contact members mounted in a ring and adapted to contact the bulb of the pear.

15. In a pear preparation machine, a pear holder comprising fingers adapted to grasp the neck of the pear externally, and a plurality of rollers mounted on a ring and adapted to contact the bulb of the pear.

16. In a pear preparation machine, a pear holder comprising a ring adapted to fit against the bulb of the pear, and two fingers interconnected for equal movement toward the axis of the pear, said fingers having opposed arcuate surfaces adapted to contact the neck of the pear on opposite sides.

17. In a pear preparation machine, a pear holder comprising fingers adapted to be resiliently pressed against the exterior of the pear at the neck, and a ring of less diameter than the bulb of the pear adapted to contact the bulb of the pear exteriorly.

18. In a pear preparation machine a pear holder having two pivoted fingers for gripping the neck of the pear, non-intermeshing gear teeth on said fingers, and a rack engaging said gear teeth on both said fingers for actuating said fingers whereby the play between the rack and gear teeth is equalized to effect accurate equalized movement of said fingers.

19. In a pear preparation machine a pear holder having two pivoted fingers for gripping the neck of the pear, non-intermeshing gear teeth on said fingers, a rack engaging said gear teeth on both said fingers for actuating said fingers, a spring urging said rack in a direction to cause accurate equalized movement of said fingers to grip the pear, and a cam to positively move said rack in the opposite direction.

20. A pear preparation machine having means for removing the skin of the pears, and a feeding mechanism for introducing the pears into said means, said feeding mechanism including a rotatable pear holder, said rotatable pear holder comprising a plurality of pear positioning and aligning members adapted to contact the pear exterior at the neck thereof, and a pear centering ring on said rotatable pear holder adapted to fit about and hold the butt side of the bulb of the pear exteriorly thereof and cooperating with said aligning members to position and align the pear with the stem blossom axis thereof in a predetermined position.

21. A pear preparation machine having means for removing the skin of the pears, and feeding mechanism for introducing the pears into said means, said feeding mechanism including a rotatable reel, a plurality of pear holders carried by said reel, each of said pear holders comprising a ring adapted to fit against the bulb of the pear, and two fingers interconnected for equal movement toward the stem axis of the pear, said fingers having opposed arcuate surfaces adapted to contact the neck of the pear on opposite sides, said surfaces being arranged so that corresponding points in the two surfaces are equi-distant from a radial line emanating from the axis of rotation of said reel.

22. A pear preparation machine having means for removing the skin of the pears, and feeding mechanism for introducing the pears into said means, said feeding mechanism including a pear holder, said pear holder comprising fingers having complementary arcuate surfaces to contact the neck of the pear, said fingers being interconnected for mutual action by means of a common actuator, a ring of rollers adapted to contact the bulb of the pear, a push rod to support and position said ring, and a spring connected to said push rod to press said ring into contact with the pear.

23. A pear preparation machine having means for removing the skin of the pears, and feeding mechanism for introducing the pears into said means, said feeding mechanism comprising a rotatable reel, pear holders mounted on said reel, each of said holders comprising a pair of fingers having complementary arcuate surfaces to contact the neck of the pear, said fingers being pivoted on said reel and having gear segments in mesh with a rack slidably mounted on said reel, and a ring of spaced-apart contacts for engaging the bulb of the pear, said ring being supported on a push rod slidably mounted on said reel for movement parallel to the stem axis of the pear.

24. In a pear preparation machine, means for cutting off the nose of the pear comprising a pear holder, including fingers resiliently grasping the pear externally at the neck, and a contact ring spring-urged against the bulb of the pear, and a knife to cut off the nose of the pear, the plane of action of said knife being disposed outside said fingers, whereby said fingers maintain their grip upon the pear after the nose has been cut therefrom by said knife.

25. A pear preparation machine having peeling means for removing the skin of the pears, and feeding mechanism for introducing the pears into said means, said feeding mechanism comprising a reel having pear holders mounted thereon, each of said holders including two fingers interconnected for equal movement and provided with complementary arcuate surfaces for contacting the neck of the pear externally, and a contact ring adapted to engage the bulb of the pear, said fingers and ring serving to position the axis of the pear parallel to the axis of rotation of said reel, and a rotary knife positioned with its plane perpendicular to said axis of rotation of said reel and outside said fingers, whereby upon rotation of said reel said knife will cut off the nose of the pear and said holder will maintain its hold upon the pear during and after the operation of cutting off the nose.

26. A pear preparation machine having a turret equipped with stemming tubes, a reel having pear holders mounted thereon, said reel being geared to said turret so that intermittent rotations cause said pear holders to be successively positioned opposite successive stemming tubes at a transfer point, a push rod mounted in said reel adjacent each holder and positioned in axial alignment with a stemming tube when the reel and turret come to rest, said push rod being adapted to be reciprocated to force the pear axially onto the stemming tube, a second push rod slidably mounted in said reel parallel to each of said first push rods, a contact ring on said second push rod, said ring constituting a part of one of said pear holders, and a fork secured to said second push rod and embracing said first push rod to maintain the center of said ring in alignment with the axis of said first push rod.

27. A pear preparation machine having a series of stemming tubes on which the pears are to be impaled, and a feeding mechanism for presenting the pears successively to said tubes with the stem of the pear in axial alignment with the tube, comprising a rotatable reel, having its axis of rotation parallel to said stemming tubes, pear holders on said reel, each holder comprising two fingers having complementary surfaces thereon adapted to contact opposite sides of the neck of the pear, said fingers being interconnected for equalized movement so that corresponding points in said complementary surfaces are always equidistant from an imaginary point whose position is fixed on a radius of said reel, and a contact ring mounted on a rod slidable in said reel so that the center of said ring moves along a line parallel to the axis of rotation of said reel, said line when extended passing through said imaginary point, whereby said ring and said fingers in grasping the pear position it with its stem axis parallel to the axis of said reel and the reel in rotating carries the holder to the stemming tube where the holder presents the pear to the stemming tube with the stem axis of the pear in axial alignment with the stemming tube.

ALBERT R. THOMPSON.